United States Patent Office 2,866,782
Patented Dec. 30, 1958

2,866,782

TALL OIL ROSIN SIZES STABILIZED AGAINST CRYSTALLIZATION AND METHODS OF MAKING SAME

Spencer H. Watkins, Wilmington, Del., assignor to Hercules Powder Company, Wilmington, Del., a corporation of Delaware No Drawing. Application September 14, 1956
Serial No. 609,801

6 Claims. (Cl. 260—105)

This invention relates to tall oil rosin sizes stabilized against crystallization and to methods of preparing the same.

Tall oil contains approximately 90% acidic material which is composed of essentially equal parts of fatty and resin acids. In the alkaline pulping processes, the acids are solubilized in the liquor, floated to the top and skimmed off the spent cooking liquor. This material, referred to as soap skimmings or crude sulfate soap, is then cooked with mineral acid to obtain crude tall oil in yields of 70–90 lb./ton of pulp.

Tall oil can be used more effectively and profitably when separated into its two main fractions, the resin acids and the fatty acids. Many processes for effecting the separation have been reported, by using the differences in both chemical and physical properties of the two classes of acids. One of the more effective means is fractional distillation of crude tall oil at reduced pressure to obtain resin and fatty acids fractions, one being contaminated with as little as 3% or less of the other. Other methods involve: (1) the fractional esterification of the fatty acids with polyhydric alcohols followed by the distillation of the resin acids, (2) total esterification of the tall oil followed by fractional saponification of the fatty acid esters followed by extraction, and (3) fractional precipitation of the resin acids out of acetone solution of the tall oil followed by decomposition of the resin acid salts with mineral acid.

Commercially available tall oil rosin is competitive with gum or wood rosin in many respects. However, rosin sizes prepared from tall oil rosin exhibit a much greater tendency to crystallize than do sizes similarly prepared from gum or wood rosin. As a result, some treatments which have been satisfactorily used for stabilizing gum and wood rosin sizes against crystallization have not worked out satisfactorily for stabilizing sizes prepared from tall oil rosin.

A principal object of the present invention is the provision of an improved method for preventing crystallization of tall oil rosin sizes.

A further object of the invention is the provision of paste tall oil rosin size compositions having improved stability against crystallization and a method of making same.

It has now been discovered that crystallization is strikingly inhibited in paste tall oil rosin sizes by the inclusion therein of from about 2% to about 20% by weight, based on the weight of rosin, of a rosin acid dimer or mixture of rosin acid dimers. Tall oil rosin sizes so treated are resistant to crystallization over relatively long periods of time even when seeded with rosin salt crystals.

Having described the invention generally, the following examples are presented in illustration but not in limitation of the invention. All parts and percentages are by weight unless otherwise specified.

EXAMPLES 1–12

All of the paste tall oil rosin sizes evaluated in these examples were prepared as follows: The tall oil rosin furnish was melted under a nitrogen blanket and heated to 160° C. In those examples wherein a crystallization inhibitor was used, the inhibitor was blended with the rosin furnish at this point. To the molten rosin was then added a hot soda ash solution containing the calculated quantity of soda ash to neutralize the desired percentage of the rosin furnish. The degree of saponification is indicated in the particular examples by setting forth the percent free rosin of the resulting size. The mix was then stirred mechanically and heated until the reaction was essentially completed. Then the solids were adjusted to give a total solids of about 80%. The paste tall oil rosin sizes were then seeded with paste size crystals and stored in an oven at 60° C. The samples were tested every three or four days to observe crystal formation. The results are set forth in the following table:

Table

| Example | Crystallization Inhibitor | Percent Inhibitor Based on Rosin | Percent Free Rosin | Crystallization |
|---|---|---|---|---|
| 1 | None | | 12 | Crystallized in 15 days. |
| 2 | Dymerex | 2.5 | 12 | Crystallized in 43 days. |
| 3 | do | 5.0 | 12 | Partially crystallized in 43 days. |
| 4 | do | 10.0 | 12 | No crystals in 43 days. |
| 5 | None | | 15 | Crystallized in 4 days. |
| 6 | Dymerex | 7.5 | 15 | Crystallized in 41 days. |
| 7 | do | 10.0 | 15 | Partially crystallized in 48 days. |
| 8 | do | 12.5 | 15 | No crystals in 48 days. |
| 9 | do | 15.0 | 15 | do. |
| 10 | None | | 21 | Crystallized in 15 days. |
| 11 | Dymerex | 10.0 | 21 | Crystallized in 42 days. |
| 12 | do | 20.0 | 21 | No crystals in 42 days. |

The Dymerex used in the examples is a pale colored thermoplastic resin sold by the Hercules Powder Company comprising approximately 80% by weight of dimeric rosin acids and having the following physical properties:

Softening point:
   Hercules drop method, ° C_____ 152
   ASTM ball and ring, ° C_____ 139
Acid number _____ 143
Saponification number:
   Regular _____ 145
   Diethylene glycol_____ 157
Unsaponifiable matter, percent_____ 6.1
Color (U. S. D. A. rosin scale)_____ M
Gasoline insoluble_____ Nil
Molecular weight (in acetone)_____ 502
Sulfur (Hercules lead oxide reactivity test)___ Negative
Density at 20° C_____ 1.069
Bromine number (KBr-KBrO₃ Method)_____ 93
Hydrogen absorption, percent_____ 0.51
Ash content, percent_____ 0.005
Liebermann—scorch test_____ Positive
Specific rotation_____ —23.2°
Weight per U. S. gallon_____ 8.91
Flash point (Cleveland Open Cup), ° F_____ 487

It will be apparent from the examples that tall oil rosin size compositions containing from about 2% to about 20% of rosin acid dimer have substantially improved resistance to crystallization. Moreover, it has been found that this improvement in crystallization tendencies is obtainable without sacrifice of sizing efficiency.

It will also be apparent from the examples that the quantity of crystallization inhibitor required depends rather heavily on the free rosin content of the size. Thus, the higher the free rosin in the size, the higher the rosin acid dimer content necessary to prevent crystallization.

The amount of rosin acid dimer required to secure effective stabilization against crystallization in paste tall oil rosin sizes containing at least about 10% free rosin, which is about the lower practical limit for free rosin in commercially utilizable rosin sizes, is from about 2% to about 20% by weight, based on the weight of the rosin. Amounts below about 2% do not give the desired stability while amounts above about 20% add very little, if anything, to the stability attained and, in addition, cause a decrease in sizing efficiency. In most cases, the amount of rosin acid dimer required will vary from about 4% to about 12%, and this range is preferred.

In the preparation of the rosin size compositions in accordance with the invention, the rosin acid dimer may be added to the tall oil rosin and the rosin then converted into size in the usual manner. Alternatively, the rosin acid dimer may be added during or after preparation of the size or prepared in situ by treating the tall oil rosin to form therein the amount of rosin acid dimer necessary to prevent crystallization.

Rosin acid dimers suitable for use herein may be prepared by conventional methods well known to the prior art. These, in general, involve treating rosin with a suitable polymerization catalyst, e. g., a strong acid such as sulfuric or phosphoric acid, an amphoteric metal halide such as aluminum chloride, zinc chloride, or boron trifluoride, an acid salt such as sodium acid sulfate, and so on. The rosins utilized may be ordinary gum, wood or tall oil rosin, specially refined and/or purified rosins and so on.

The process of the invention is applicable to the stabilization of rosin size compositions prepared from tall oil rosin. While tall oil rosin varies somewhat depending on its derivation and method of recovery and purification, the following are typical properties of such a product prepared by fractional distillation at reduced pressures.

| | |
|---|---|
| Acid number | 168–172 |
| Saponification number | 172–178 |
| Softening point (ring and ball), ° C | 78–85 |
| Resin acids (percent) | 89.0–91.0 |
| Fatty acids (percent) | 1–3 |
| Ultraviolet: | |
| Total abietic-type acid (percent) | 45–55 |
| Dehydroabietic acid (percent) | 15–20 |
| Color (USDA rosin color scale) | N–WG |
| Specific rotation | −5.0 to +5.0 |

The process of the invention is also applicable to the preparation of tall oil rosin size compositions containing adducts of rosin and materials such as maleic acid, maleic anhydride, fumaric acid, itaconic acid, citraconic acid and the like, and known in the art as fortified rosin sizes. As before, the rosin acid dimer can be added at any desired point before, during or after size formation and before, during or after addition and/or formation of the adduct.

It will thus be seen that the process of the invention permits the preparation of rosin sizes stabilized against crystallization in both the paste and dilute emulsion (3% total solids) forms even when seeded and held in storage at 60° C. While preferred embodiments of the invention have been described herein, the invention is not to be concluded as limited thereby except as the same may be included in the following claims.

What I claim and desire to protect by Letters Patent is:

1. A method of stabilizing tall oil rosin sizes against crystallization which comprises incorporating therein from 2% to 20% by weight, based on the weight of rosin, of rosin acid dimer.

2. A method of stabilizing paste tall oil rosin sizes against crystallization which comprises incorporating therein from 2% to 20% by weight, based on the weight of rosin, of a mixture of rosin acid dimers.

3. A method of stabilizing paste tall oil rosin sizes against crystallization which comprises incorporating therein from 2% to 20% by weight, based on the weight of rosin, of rosin dimer.

4. A paste tall oil rosin size composition containing, as a crystallization inhibitor, from 2% to 20% by weight, based on the weight of rosin, of rosin acid dimer.

5. A paste tall oil rosin size composition containing, as a crystallization inhibitor, from 2% to 20% by weight, based on the weight of rosin, of a mixture of rosin acid dimers.

6. A paste tall oil rosin size composition containing, as a crystallization inhibitor, from 2% to 20% by weight, based on the weight of rosin, of rosin dimer.

References Cited in the file of this patent

UNITED STATES PATENTS 2,017,866     Morton     Oct. 22, 1935